United States Patent
Asahina et al.

(10) Patent No.: US 7,210,626 B2
(45) Date of Patent: May 1, 2007

(54) WIRELESS TAG INFORMATION MANAGEMENT DEVICE

(75) Inventors: Shigetoshi Asahina, Mishima (JP); Satoshi Ohishi, Mishima (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/387,027

(22) Filed: Mar. 22, 2006

(65) Prior Publication Data

US 2007/0063030 A1    Mar. 22, 2007

(30) Foreign Application Priority Data

Sep. 22, 2005   (JP)   .............................. 2005-276591
Dec. 7, 2005    (JP)   .............................. 2005-353618

(51) Int. Cl.
*G06F 19/00*   (2006.01)
*G06F 17/00*   (2006.01)

(52) U.S. Cl. ...................................... 235/385; 235/375

(58) Field of Classification Search ................ 235/375, 235/385

See application file for complete search history.

(56) References Cited

U.S. PATENT DOCUMENTS

| | | | |
|---|---|---|---|
| 6,354,493 B1* | 3/2002 | Mon | 235/380 |
| 2002/0180588 A1* | 12/2002 | Erickson et al. | 340/10.2 |
| 2002/0185532 A1* | 12/2002 | Berquist et al. | 235/385 |
| 2006/0139172 A1* | 6/2006 | Waldner et al. | 340/572.7 |

FOREIGN PATENT DOCUMENTS

JP    2004-115214    4/2004

* cited by examiner

*Primary Examiner*—Thien M. Le
*Assistant Examiner*—April Taylor
(74) *Attorney, Agent, or Firm*—Amin, Turocy & Calvin, LLP

(57) ABSTRACT

Articles being information management objects are brought together and stored in a preservation place arranged within the communication area by an antenna and a reader/writer unit, and electric wave communication of having an access to only wire-less tags of the number of the information management objects located in the preservation place or the number (object number) to be processed is performed, and communication without excess and deficiency is realized.

5 Claims, 3 Drawing Sheets

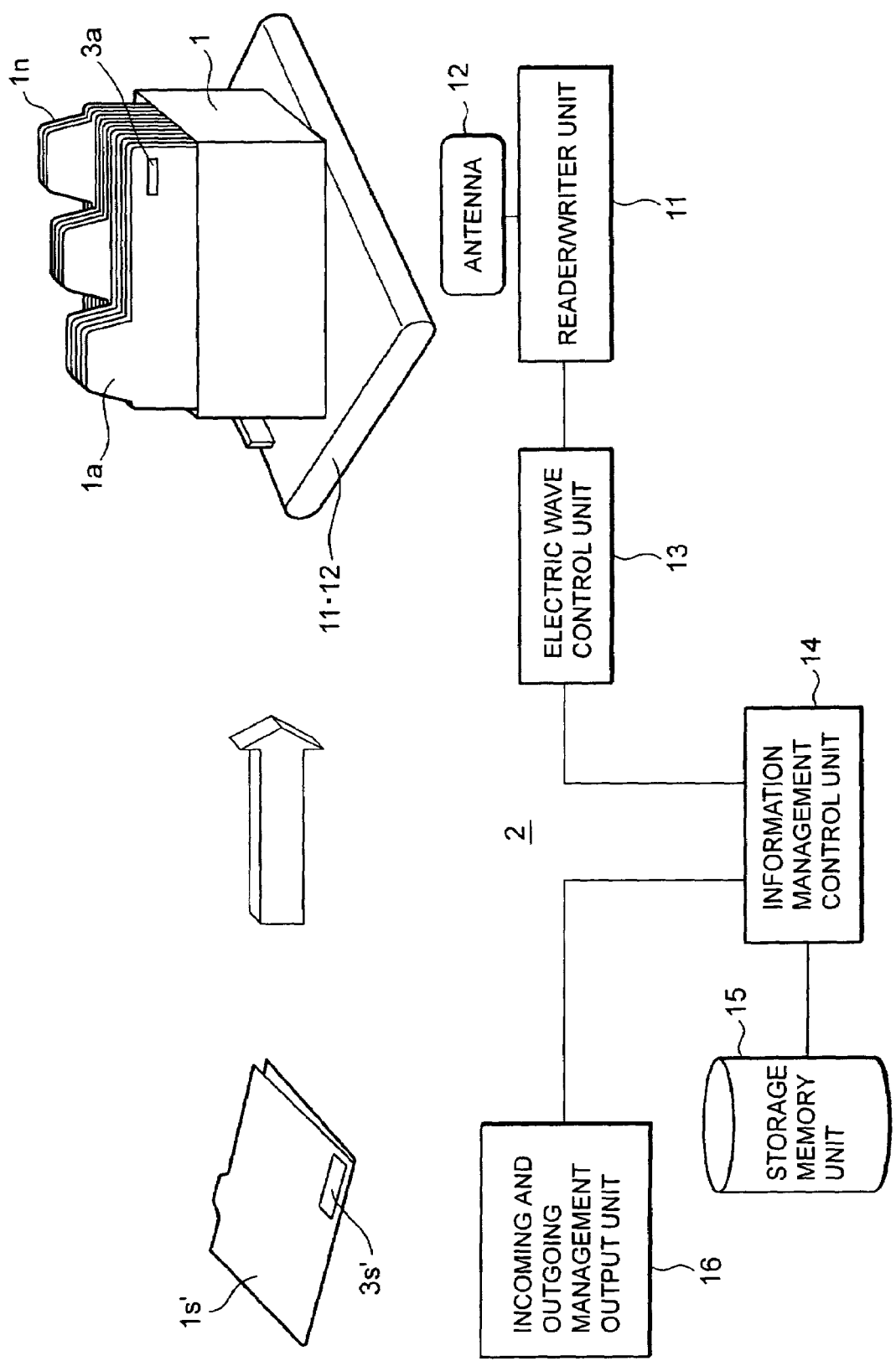

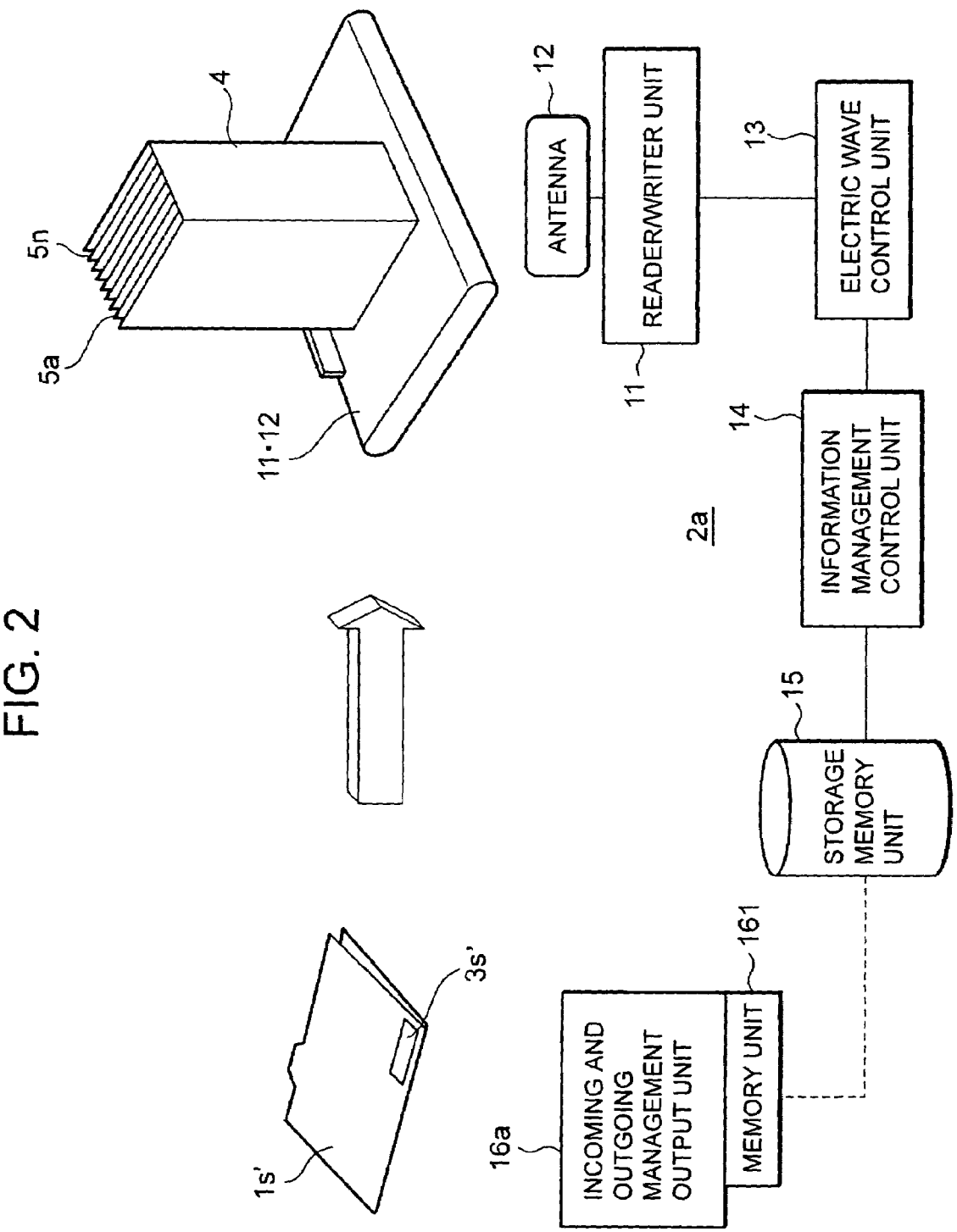

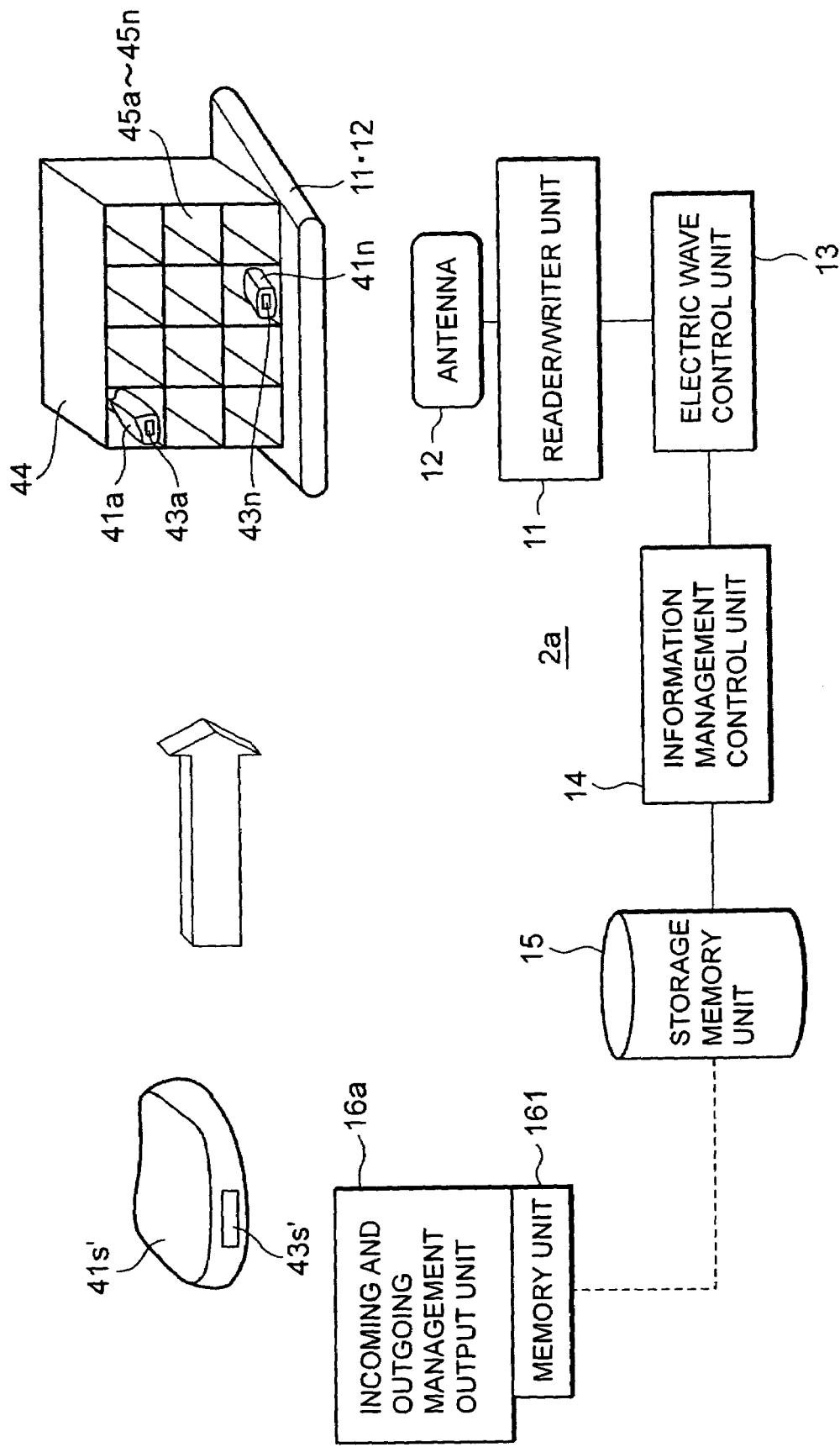

WIRELESS TAG INFORMATION MANAGEMENT DEVICE

CROSS-REFERENCE TO RELATED APPLICATIONS

This application is based upon and claims the benefit of priority from the prior Japanese Patent Applications No. 2005-276591, filed on 22 Sep. 2005, and No. 2005-353618, filed on 7 Dec. 2005; the entire contents of which are incorporated herein by reference.

BACKGROUND OF THE INVENTION

1. Field of the Invention

The present invention relates to a wireless tag information management device that devises controlling electric wave radiation by a reader/writer of an information management device that communicates with wireless tags.

2. Description of the Related Art

Recently, wireless tags being wireless data carriers, each of which has set up therein inherent ID, has a memory area in which information can be rewritten, and can identify its inherent ID or write and read out the information in a noncontact manner using an electric wave signal, are coming into use.

For example, mail articles and deliveries are made to have attached thereto or built therein a wireless tag having set up therein inherent ID respectively. Accordingly, those mail articles and deliveries can be identified by transmitting and receiving a communication electric wave signal respectively from a reader/writer arranged at the pathway when they are transported. Furthermore, documents and books are made to have attached thereto a wireless tag. Then, a reader/writer that transmits and receives an electric wave signal similarly can detect whether or not an intended article exists among those multiple stored documents and books.

Generally, a conventional reader/writer that transmits and receives a communication electric wave signal carries out system processing for communication by always radiating a power electric wave for activating wireless tags located in the communication area and a signal electric wave of communication information, or radiating such electric waves during a time period set up by a host device of an entire system, from an antenna of the reader/writer.

Under above-described conventional system technique for communicating with wireless tags, a reader/writer keeps on radiating an electric wave during a set up communication time period irrespective of the existence or nonexistence of wireless tag, that is, even if there is no wireless tag. Such electric wave radiation leads to wasteful power consumption, which is a problem.

BRIEF SUMMARY OF THE INVENTION

According to embodiments of the present invention, an object of the present invention is to provide a wireless tag information management device that suppresses wastefully radiating an electric wave to communicate with wireless tags, and radiating an electric wave in a short period of time.

The present invention may provide a wireless tag information management device, comprising: management objects having attached thereto wireless tags; a storage unit for storing the management objects by a storage number determined in advance; a reader/writer unit for radiating an electric wave to the management objects stored in the storage unit to read out information of the wireless tags; and an electric wave control unit for, when the number of the management objects having attached thereto the wireless tags whose information is read out by the reader/writer unit gets to the storage number determined in advance, suspending radiation of the electric wave from the reader/writer unit.

BRIEF DESCRIPTION OF THE DRAWINGS

FIG. 1 shows a schematic view of a wireless tag information management device indicative of one embodiment of the present invention;

FIG. 2 shows a schematic view of a wireless tag information management device indicative of another embodiment of the present invention; and FIG. 3 shows a schematic view of a wireless tag information management device indicative of variation of another embodiment of the present invention.

DETAILED DESCRIPTION OF THE INVENTION

The present invention will further be described below with reference to the accompanying drawings.

First Embodiment

The upper side of FIG. 1 shows a schematic view of the first embodiment according to the present invention, while the lower side shows a block diagram of a wireless tag information management device that performs a method of generating a timing to cut off communication with wireless tags.

For example, information management objects in the embodiment are document files 1a to 1n, 1s' having attached thereto wireless tags 3a to 3n, 3s' which have recorded therein information to be identified individually, and are stored in a document file box 1 or stored in as a document file bunch. A wireless tag information management device 2 (referred to as information management device 2 for short, hereinafter) includes a reader/writer unit 11 that has connected thereto an antenna 12 for communicating with the wireless tags 3a to 3n located in the document file box 1, an electric wave control unit 13 for controlling communication by electric wave radiation carried out by the reader/writer unit 11, an information management control unit 14 for controlling the entire information management device 2, a storage memory unit 15 for storing various data including "storage number" to be described later, an incoming and outgoing management output unit 16 for monitoring and managing the incoming and outgoing of the document file 1s' being an information management object.

Next, the operation and performance in the present embodiment will be explained. In the embodiment, for example, the document file box 1 is installed at a place for preserving and storing management objects within the communication area by the antenna 12 and the reader/writer unit 11, and the incoming and outgoing management output unit 16 surely grasps "incoming" that is newly added to be put in the document file box 1 and "outgoing" that is taken out to be put outside from the document file box 1 as the incoming and outgoing of the document file 1s'.

In order to surely grasp the incoming and outgoing of the document file 1s', a designation device for designating the "incoming" and "outgoing" is arranged right before the document file box 1 installed at the place for preserving and storing management objects within communication area by the antenna 12 and the reader/writer unit 11. Then, there is arranged a window in which the document file box 1 cannot be reached unless either the "incoming" or "outgoing" is operated when having an access to the document file box 1 to deal with the document file 1s', and it is judged which of the "incoming" or "outgoing" is operated. Otherwise, there may be arranged a passing direction detection device that detects the passage of the document file 1s' at two points, and determines the "incoming" or "outgoing" using the detection order, thereby grasping the incoming and outgoing.

Information of the "incoming" or "outgoing" that is grasped by the incoming and outgoing management output unit 16 is sent to the information management control unit 14 for managing and controlling the entire information management device 2, and data value of "total number", which is the storage number stored in the storage memory unit 15, is incremented by one in case of "incoming", while is decremented by one in case of "outgoing". The data "total number" is a value indicative of preservation storage total number at the time of the files 1a to 1n existing in the document file box 1 being the preservation place, and is updated for each "incoming" or "outgoing" of an object document file. The communication result is retained in part of the storage memory unit 15, and the information management device 2 is made standby.

When the information management device 2 in the standby state is instructed to retrieve or read out information stored in the wireless tags 3a to 3n which are individually attached to the management objects, or fill or write new information to the wireless tags 3a to 3n, the information management control unit 14 sends the instruction contents as well as the data value of "total number" of the storage memory unit 15 to the electric wave control unit 13 to make contact.

The electric wave control unit 13 that receives the instruction contents and the data value of "total number" firstly writes the data value of "total number" to a data "unprocessed number" memory arranged in the electric wave control unit 13. Then, an access signal for the instruction, which becomes an electric wave signal for communication to be radiated from the antenna 12 to the wireless tags 3a to 3n attached to the document files 1a to 1n stored in the document file box 1 being the preservation storage place arranged within the communication area, is sent from the electric wave control unit 13 to the reader/writer unit 11.

Furthermore, the reader/writer unit 11 converts thus input access signal for the wireless tags to a communication electric wave signal, and transmits and receives thus converted communication electric wave signal through the antenna 12. Every time communication for one document file is ended, data value of "unprocessed number" of the electric wave control unit 13 is decremented by one. Then, prior to the next transmission and reception to be carried out consecutively, the electric wave control unit 13 determines that data value of the "unprocessed number" memory is not "zero", and sends a subsequent access signal for the same instruction to the reader/writer unit 11 again.

In case it is determined that data value of the "unprocessed number" memory is "zero", the electric wave control unit 13 suspends outputting an access signal to the reader/writer unit 11, suspends radiating an electric wave from the antenna 12 of the reader/writer unit 11, ends electric wave communication of transmission and reception for a series of instructions from the information management control unit 14, and the information management device 2 returns to the original standby state to wait for the next access instruction.

According to the embodiment, articles being information management objects are brought together and stored in the preservation place arranged within the communication area by the antenna and the reader/writer unit, and electric wave communication of having an access to only wireless tags of the number of the information management objects located in the preservation place or the number (object number) to be processed is performed.

Communication without excess and deficiency is realized. Accordingly, no unnecessary electric wave is radiated and unnecessary electric wave radiation to the surrounding environment can be suppressed, which can provide a wireless tag information management device capable of reducing electric power consumption. Furthermore, it becomes possible to provide a wireless tag information management method that can suppress unnecessary electric wave radiation by performing processing procedures by the respective components in the embodiment.

In the embodiment, the state of "incoming" or "outgoing" is surely grasped by the incoming and outgoing management output unit 16, the data value of "total number" being the storage number is obtained, and electric wave communication by the reader/writer unit 11 is controlled. On the other hand, the incoming and outgoing management output unit 16 may grasp the state of "incoming" or "outgoing" by counting the number or carrying out stocktaking to arbitrarily confirm the number of objects, and, during a time period until the number is counted next time, obtaining the "total number" based on the counting result and the difference between the "incoming" and "outgoing" during the time period. Accordingly, by arranging a means to perform the manner and obtaining the "total number" instead of arranging the incoming and outgoing management output unit 16, similar effects can be obtained.

Second Embodiment

Next, other embodiments of the present invention will further be described below with reference to the accompanying drawings. The upper sides of FIG. 2 and FIG. 3 show schematic views of other embodiments, while the lower sides show block diagrams thereof.

As shown in FIG. 2, at the place for preserving information management objects within the communication area by the antenna 12 and the reader/writer unit 11, there is arranged a file binder 4 for storing document files 1a to in having attached thereto wireless tags 3a to 3n. The file binder 4 is of configuration under which the total storage number of the document files 1a to in to be stored can be set up in advance, and has bound therein file storage matters 5a to 5n in the form of bags of a predetermined number, to and from each of which a single document file can be put in and taken out. Furthermore, as shown in FIG. 3, at the preservation place, there is arranged an article shelf 44 for storing articles 41a to 41n having attached thereto or stuck thereto wireless tags 43a to 43n. The article shelf 44 is of configuration under which the total storage number of the articles 41a to 41n to be stored can be set up in advance, and has formed therein small racks 45a to 45n of a predetermined number, in each of which a single article can be stored. In this case, similarly, the upper limit number of information management objects is determined in advance.

A wireless tag information management device 2a (referred to as information management device 2a for short, hereinafter), in which the upper limit number of information management objects to be dealt with is determined in advance, includes a reader/writer unit 11 that has connected thereto an antenna 12 for communicating with the wireless tags 3a to 3n (43a to 43n), an electric wave control unit 13 connected to the reader/writer unit 11, an information management control unit 14 for controlling the entire information management device 2a, and a storage memory unit 15 for storing various data.

Furthermore, there is arranged an incoming and outgoing management output unit 16a for managing the incoming and outgoing of a document file 1s' to and from the preservation place arranged within the communication area by the reader/writer unit 11 having connected thereto the antenna 12, which has a maximum storage number memory unit 161. In the maximum storage number memory unit 161, a predetermined maximum storage number of the file binder 4 or the article shelf 44, which is placed at the preservation place in the embodiment in advance, is determined in advance and stored.

Next, the operation and performance in the present embodiment will be explained using the block diagram shown in FIG. 3, in which the file binder 4 is placed in the preservation place arranged within the communication area by the reader/writer unit 11 having connected thereto the antenna 12 in the information management device 2a.

In the embodiment, the incoming and outgoing management output unit 16a surely grasps the "incoming" and "outgoing" of the document file 1s', that is newly adding the document file 1s' to the file binder 4 being the preservation place located within the communication area by the reader/writer unit 11 having connected thereto the antenna 12, and taking out the document file 1s' from the file binder 4, in a manner similar to that employed in the first embodiment to judge the "incoming" and "outgoing". That is, the incoming and outgoing management output unit 16a grasps the "incoming" and "outgoing" of the document file 1s' and monitors the "incoming" and "outgoing" so that the document file 1s' is made to come in or take out within a range not larger than a maximum storage number N of the file binder 4 which is set up in the maximum storage number memory unit 161 of the incoming and outgoing management output unit 16a in advance, that is, so that the "incoming" is carried out within a range not going beyond the maximum storage number N. For example, in case of an "incoming" that goes beyond the maximum storage number N, an alarm notifying that the document file 1s' cannot be stored in the file binder 4 is issued or displayed.

In the embodiment, the incoming and outgoing is detected in a manner similar to that employed by the incoming and outgoing management output unit 16 in above-described embodiment. On the other hand, in the embodiment, the total number of the document files 1a to in retained in the file binder 4 at respective time points is compared with data of the maximum storage number memory unit 161 arranged in the incoming and outgoing management output unit 16 for judgment, and is not send or transmitted to any of the components of the information management device 2a. Accordingly, the maximum storage number N of the file binder 4, which is set up in the maximum storage number memory unit 161 in advance, is set up by one-way communication from the storage memory unit 15 or set up directly by the incoming and outgoing management output unit 16a manually.

On the other hand, the file binder 4 is placed at the preservation place located within the communication area by the antenna 12 and the reader/writer unit 11, and concurrently the maximum storage number N of the file binder 4 is set up and stored in the storage memory unit 15 of the information management device 2a in advance. With respect to the maximum storage number memory unit 161 of the incoming and outgoing management output unit 16a, the maximum storage number N of the file binder 4, which is set up in the storage memory unit 15 in advance, is set up by one-way communication when the maximum storage number N is set up in the storage memory unit 15.

In this way, the maximum storage number N is set up, and a requirement and instruction for information inquiry concerning the document files 1a to 1n stored in the file binder 4 is sent to the information management device 2a in the standby state. Responding to the requirement and instruction for information inquiry, the information management control unit 14 of the information management device 2a sends instruction contents corresponding to the inquiry as well as the maximum storage number N of the storage memory unit 15 to the electric wave control unit 13 to make contact.

The electric wave control unit 13, which receives the instruction, etc., firstly writes the maximum storage number "N" to a memory "unprocessed number" of the electric wave control unit 13 as numeric data.

Next, information that is recorded in the wireless tags 3a to 3n attached to the respective document files 1a to 1n of the file binder 4, which is instructed by the information management control unit 14, is retrieved and read out, and as for filling or writing new information, the information is sent to the electric wave control unit 13 to make contact. Then, the electric wave control unit 13 that receives the instruction contents firstly confirms that the data value of the memory "unprocessed number" is not "zero", and then outputs an access signal which becomes an electric wave signal to be radiated from the antenna 12 to the reader/writer unit 11.

The reader/writer unit 11 that receives the access signal transmits the access signal for the wireless tags 3a to 3n attached to the document files 1a to in of the file binder 4, which are closely located, through the antenna 12 by electric wave communication, and communicates with one of the wireless tags 3a to 3n. Then, every time communication for one inquiry/writing is ended, the data value of the memory "unprocessed number" is decremented by one.

Before receiving a subsequent access signal for the following inquiry/writing, the electric wave control unit 13 determines that the data value of the memory "unprocessed number" is not "zero", outputs an access signal for instruction of the inquiry to the reader/writer unit 11 again, and performs transmission and reception by electric wave communication with another one of the wireless tags 3a to 3n again. On the other hand, in case it is determined that the memory "unprocessed number" is "zero", outputting an access signal to the reader/writer unit 11 is suspended, radiating a communication electric wave from the antenna 12 is suspended, a series of radiation of electric wave for the instruction of information inquiry is ended, and the information management device 2a comes into the standby state until the next instruction is sent to the information management control unit 14.

That is, in the embodiment, an access of instruction for the inquiry is carried out by communication using an electric wave with the wireless tags 3a to 3n up to N times being the maximum storage number of the document files 1a to 1n which have the possibility of being stored in the file binder 4, and then radiation of electric wave is suspended, coming into the standby state, until a subsequent new inquiry is made.

The upper side of FIG. 3 shows a schematic view of variation of the embodiment, in which the bulky articles 41a to 41*n* being objects are managed by the article shelf 44 that stores the articles by a predetermined number (maximum storage number N).

The article 41 has attached thereto or stuck thereto the wireless tag 43, in which information concerning the article is written and stored in a memory unit. For example, so as to manage sorting for delivery, the articles 41*a* to 41*n* are stored in the small racks 45*a* to 45*n* of the article shelf 44, a single small rack 45 for a single article 41, or are taken out from the article shelf 44. That is, articles of up to the maximum storage number N can be stored.

In this way, for the wireless tags 43*a* to 43*n* attached to the respective articles 41*a* to 41*n* placed in the article shelf 44, as described above, instruction of information inquiry concerning the articles 41*a* to 41*n* stored in the article shelf 44 is sent to the information management device 2*a*. Responding to the instruction of information inquiry, the information management control unit 14 sends instruction contents corresponding to the inquiry as well as the maximum storage number N of the storage memory unit 15 to the electric wave control unit 13 to make contact, and by performing above-described procedures, an access signal of instruction for the inquiry is sent to the reader/writer unit 11, and communication using an electric wave is carried out with the wireless tags 43*a* to 43*n* up to N times being the maximum storage number of the articles 41*a* to 41*n* which have the possibility of being stored in the article shelf 44, and then radiation of electric wave is suspended, coming into the standby state, until a subsequent new inquiry is made and the instruction is sent from the information management control unit 14 to the reader/writer unit 11 through the electric wave control unit 13.

According to the embodiment, in case the maximum storage number N of the information management objects is set up in advance in the reader/writer unit connected to the antenna, or the upper limit is placed on the allowable number for preservation in configuration, unnecessary communication for a number going beyond the number of wireless tags being objects is not performed. Accordingly, it becomes possible to provide a wireless tag information management device that can sufficiently manage information without radiating an unnecessary electric wave. Furthermore, it also becomes possible to provide a wireless tag information management method that can suppress unnecessary electric wave radiation and sufficiently manage information by performing processing procedures by the respective components in the embodiment.

What is claimed is:

1. A wireless tag information management device, comprising:

management objects having attached thereto wireless tags;

a storage unit for storing the management objects by a storage number determined in advance;

a reader/writer unit for radiating an electric wave to the management objects stored in the storage unit to read out information of the wireless tags; and an electric wave control unit for, when the number of the management objects having attached thereto the wireless tags whose information is read out by the reader/writer unit gets to the storage number determined in advance, suspending radiation of the electric wave from the reader/writer unit, wherein the electric wave control unit has a counter for reading out the storage number determined in advance, and, in case a determination made that the counter value is one or more, information of the wireless tags is read out by the reader/writer unit, the counter is decremented by one, returning to the counter judgment, while in case a determination made that the counter value is zero or less, radiation of electric wave by the reader/writer unit is suspended.

2. The wireless tag information management device as set forth in claim 1, wherein the storage unit is configured by a file binder having bound therein file storage matters of a predetermined number which stores document files being the management objects, enabling incoming and outgoing of the document files.

3. The wireless tag information management device according to claim 1, wherein the storage unit is constituted by an article shelf that has formed therein small racks of a predetermined number, in each of which a single article to be managed is stored, and from each of which an article to be managed is taken out.

4. A wireless tag information management device, comprising:

management objects having attached thereto wireless tags;

a storage unit for storing the management objects by a storage number determined in advance;

a reader/writer unit for radiating an electric wave to the management objects stored in the storage unit to read out information of the wireless tags;

an incoming and outgoing management output unit for judging the incoming or outgoing of the management objects to or from the storage unit, and calculating a storage number by subtracting the difference number of the management objects obtained by the incoming or outgoing judgment from the storage number determined in advance; and an electric wave control unit for, when the number of the management objects having attached thereto the wireless tags whose information is read out by the reader/writer unit gets to the storage number calculated by the incoming and outgoing management output unit, suspending radiation of electric wave by the reader/writer unit, wherein the electric wave control unit has a counter for reading out the storage number calculated or output by the incoming and outgoing management output unit, and, in case a determination made that the counter value is one or more, information of the wireless tags is read out by the reader/writer unit, the counter is decremented by one, returning to the counter judgment, while in case a determination made that the counter value is zero or less, radiation of electric wave by the reader/writer unit is suspended.

5. A wireless tag information management device, comprising:

management objects having attached thereto wireless tags;

a storage unit for storing the management objects by a storage number determined in advance;

a reader/writer unit for radiating an electric wave to the management objects stored in the storage unit to read out information of the wireless tags;

an incoming and outgoing management output unit for arbitrarily counting the number of the stored management objects, judging the incoming or outgoing of the management objects to or from the storage unit, and outputting the storage number of the management objects stored in the storage unit; and an electric wave control unit for, when the number of the management objects having attached thereto the wireless tags whose information is read out by the reader/writer unit gets to the storage number output by the incoming and outgoing management output unit, suspending radiation of electric wave by the reader/writer unit, wherein the electric wave control unit has a counter for reading out the storage number calculated or output by the incoming and outgoing management output unit, and, in case a determination made that the counter value is one or more, information of the wireless tags is read out by the reader/writer unit, the counter is decremented by one, returning to the counter judgment, while in case a determination made that the counter value is zero or less, radiation of electric wave by the reader/writer unit is suspended.

* * * * *